(12) United States Patent
Banik et al.

(10) Patent No.: US 11,965,982 B1
(45) Date of Patent: Apr. 23, 2024

(54) LIDAR SENSOR SYSTEM INCLUDING INTEGRATED TRANSCEIVER

(71) Applicant: Aurora Operations, Inc., Mountain View, CA (US)

(72) Inventors: Swarnav Banik, San Jose, CA (US); Andrew Steil Michaels, Los Altos, CA (US); Phillip Sandborn, Sacramento, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/484,930

(22) Filed: Oct. 11, 2023

(51) Int. Cl.
*G01S 7/48* (2006.01)
*B60W 60/00* (2020.01)
*G01S 7/481* (2006.01)
*G01S 17/931* (2020.01)

(52) U.S. Cl.
CPC .......... *G01S 7/4815* (2013.01); *B60W 60/00* (2020.02); *G01S 17/931* (2020.01); *B60W 2420/52* (2013.01)

(58) Field of Classification Search
None
See application file for complete search history.

(56) References Cited

U.S. PATENT DOCUMENTS

| 9,823,496 B1 * | 11/2017 | Doerr | H01S 5/0064 |
| 2017/0350964 A1 * | 12/2017 | Kaneda | G01S 7/4865 |
| 2018/0188371 A1 * | 7/2018 | Bao | G01S 17/931 |

* cited by examiner

*Primary Examiner* — Hovhannes Baghdasaryan
(74) *Attorney, Agent, or Firm* — Dority & Manning, P.A.

(57) ABSTRACT

A LIDAR sensor system for a vehicle can include a light source configured to generate a beam; at least one optical amplifier configured to amplify the beam to produce an amplified beam; an optical power distribution network; a transmitter configured to receive the plurality of distributed beams; and one or more optics configured to emit the plurality of distributed beams. The optical power distribution network can include at least one input port configured to receive the amplified beam; one or more optical splitters configured to split the amplified beam into a plurality of distributed beams; a plurality of output ports respectively configured to provide the plurality of distributed beams; and one or more optical isolators configured to attenuate reflected signals at the plurality of output ports by coherently interfering the reflected signals.

20 Claims, 7 Drawing Sheets

LIDAR SENSOR SYSTEM INCLUDING INTEGRATED TRANSCEIVER

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the present disclosure will be set forth in part in the following description, or may be learned from the description, or may be learned through practice of the implementations.

Example aspects of the present disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

The present disclosure is directed to LIDAR systems for use with, for example, vehicles. A LIDAR system according to example aspects of the present disclosure includes a LIDAR module that includes an emitter configured to emit a light beam. The LIDAR module includes an optic device configured to split the light beam into a plurality of light beams. The LIDAR module includes an optical amplifier array configured to amplify the plurality of light beams to generate a plurality of amplified light beams. For instance, the optical power of the amplified light beams can, in some implementations, range from 10 decibels greater than an optical power of the plurality of light beams to 30 decibels greater than the optical power of the plurality of light beams. The LIDAR module includes a transceiver configured to facilitate transmitting the plurality of amplified light beams into a surrounding environment. The transceiver is further configured to receive return light beams from the surrounding environment that can be combined to generate point cloud data representative of objects in the surrounding environment.

An integrated LIDAR system typically consists of complex circuits of photonic elements, which may include multiple types of semiconductor materials. An optical signal (e.g., a light signal) generally propagates in a single direction through the LIDAR system through one or more waveguides, such as from a light source to optics and/or from optics to a signal converter. However, the elements that make up these circuits, the interfaces between semiconductor materials, and other components of the LIDAR system may reflect some of the optical signal backwards through the LIDAR system. Some active optical components that may be used in a LIDAR system, such as active optical amplifiers, can be sensitive to these back reflections. Reducing these back reflections can therefore be beneficial for improving operational characteristics of a LIDAR system.

The present disclosure provides an approach to implementing optical isolators in optical power distribution networks, such as optical power distribution networks for integrated LIDAR systems. An optical power distribution network can be or can include a 1×N splitter. The 1×N splitter can be formed by cascaded 1×2 splitters. One or more of the splitters can be optical isolators that are actively controlled to reduce the effect of an optical signal reflecting back into the optical power distribution network. For instance, the first splitter and/or the final row of splitters can be replaced by the optical isolators.

The optical power distribution network can be coupled to optical amplifiers in a LIDAR system. The optical power distribution network can distribute amplified optical signals to a plurality of devices (e.g., transmitters and/or optics of a LIDAR system). The use of the optical isolators can reduce the incidence of reflected signals from those amplified optical signals back into the optical amplifier(s). The optical amplifier(s) may be susceptible to those reflections. For instance, the optical amplifier(s) may be active, nonlinear devices that behave unpredictably when exposed to reflected optical signals at the output ports. Therefore, reducing the reflected optical signal by utilizing optical isolators can improve the operational characteristics, such as accuracy, reliability, etc., of the LIDAR system.

The optical isolator can be configured such that an optical signal passing forward through the optical isolator is not attenuated to a significant degree, and any portion of that optical signal reflected back into the optical isolator coherently interferes with signals in the optical isolator such that the reflected signal is at least greatly attenuated or eliminated at the input ports of the isolator. For instance, in one implementation, the optical isolator includes a two-way optical splitter with phase shifters at each output arm of the optical splitter. An electrical signal is applied to at least one of the phase shifters to control the phase of the optical signal such that any reflected signals at the two output ports of the two-way optical splitter coherently interfere. Furthermore, to improve performance in cases where an optical signal reflected at one output port of the splitter is not well balanced with the optical signal reflected at the other output port of the splitter, the optical isolator can include attenuators at one or both output arms of the splitter so as to attenuate the stronger of the two reflected signals such that the reflected signals at each output port can destructively interfere.

The reflected signal that is not removed by interference can be provided to a power dump port coupled to one or more light dissipation devices such as, for example, photoresistors, photodiodes, etc. The light dissipation devices can dissipate the reflected light such that it is not reflected further through the LIDAR system. Furthermore, in some embodiments, the power dump port and/or the light dissipation devices can be coupled to and/or can be a portion of a feedback loop configured to tune the optical isolator (e.g., the phase shifters and/or attenuators in each output arm of the isolator). The feedback loop can be configured to tune the optical isolator to respond to variations in the reflected optical signals over time. For instance, the feedback loop can produce one or more control signals for the optical isolator to tune the optical isolator based on the reflected signal at the power dump port.

Example aspects of the present disclosure can provide a number of technical effects and benefits. As one example, example aspects of the present disclosure can improve the robustness of LIDAR systems and/or components of LIDAR systems by utilizing one or more optical isolators configured to attenuate reflected signals by coherently interfering the reflected signals. Coherently interfering the reflected optical signals can reduce detrimental performance effects of the reflected optical signals in the LIDAR systems, such as, but not limited to, interference between the reflected optical signals and optical amplifiers of the LIDAR systems, nonlinear operation of the optical amplifiers resulting from the reflected optical signals, and so on. For instance, the LIDAR systems may be more tolerant to reflected optical signals by incorporating optical isolators according to the present disclosure. As another example, the present disclosure can improve performance characteristics of the LIDAR systems. For instance, by reducing the effect of reflected optical signals at optical amplifiers of the LIDAR system, the LIDAR system can output more accurate detections as a result of the reduced interference with the optical amplifiers of the LIDAR system.

For example, aspects of the present disclosure provide for a LIDAR sensor system for a vehicle. The LIDAR sensor system can include a light source configured to generate a beam. The LIDAR sensor system can include at least one optical amplifier configured to amplify the beam to produce an amplified beam. The LIDAR sensor system can include an optical power distribution network including: at least one input port configured to receive the amplified beam; one or more optical splitters configured to split the amplified beam into a plurality of distributed beams; a plurality of output ports respectively configured to provide the plurality of distributed beams; and one or more optical isolators configured to attenuate reflected signals at the plurality of output ports by coherently interfering the reflected signals. The LIDAR sensor system can include a transmitter configured to receive the plurality of distributed beams. The LIDAR sensor system can include one or more optics configured to emit the plurality of distributed beams.

In some implementations, the one or more optical splitters include a plurality of rows of cascaded two-way optical splitters.

In some implementations, the one or more optical isolators are configured at a first row of the plurality of rows.

In some implementations, the one or more optical isolators are configured at a final row of the plurality of rows.

In some implementations, the one or more optical isolators respectively include an optical splitter having at least one input port and a plurality of output ports and a phase shifter respectively coupled to the plurality of output ports of the optical splitter.

In some implementations, the optical splitter of the one or more optical isolators comprises a two-way splitter having two output ports.

In some implementations, the one or more optical isolators include one or more attenuators that are coupled to the plurality of output ports of the optical splitter.

In some implementations, a particular attenuator of the one or more attenuators can include a Mach-Zehnder modulator. The Mach-Zehnder modulator can include a first optical splitter comprising two output ports; two phase shifters coupled to the two output ports of the first optical splitter; and a second optical splitter comprising two input ports that are respectively coupled to the two phase shifters. A control signal line can be coupled to a particular phase shifter of the two phase shifters.

In some implementations, a particular optical isolator of the one or more optical isolators can include a control signal line coupled to the phase shifter at one of the plurality of output ports of the optical splitter.

In some implementations, a particular optical isolator of the one or more optical isolators can include at least two input ports, and at least one of the at least two input ports is coupled to a light dissipation device.

In some implementations, a particular optical isolator of the one or more optical isolators comprises at least two input ports, and at least one of the at least two input ports is coupled to a light dissipation device.

In some implementations, the at least one optical amplifier is active and nonlinear.

In some implementations, the one or more optics are configured to emit the plurality of distributed beams, and the LIDAR sensor system further includes a receiver configured to receive a reflected beam and determine an object detection associated with an object that reflected the reflected beam.

For example, aspects of the present disclosure provide for an autonomous vehicle (AV) control system. The AV control system can include a LIDAR sensor system. The LIDAR sensor system can include a light source configured to generate a beam. The LIDAR sensor system can include at least one optical amplifier configured to amplify the beam to produce an amplified beam. The LIDAR sensor system can include an optical power distribution network including: at least one input port configured to receive the amplified beam; one or more optical splitters configured to split the amplified beam into a plurality of distributed beams; a plurality of output ports respectively configured to provide the plurality of distributed beams; and one or more optical isolators configured to attenuate reflected signals at the plurality of output ports by coherently interfering the reflected signals. The LIDAR sensor system can include a transmitter configured to receive the plurality of distributed beams. The LIDAR sensor system can include one or more optics configured to emit the plurality of distributed beams. The LIDAR sensor system can include a receiver configured to receive a reflected beam from the object and determine an object detection associated with the object. The AV control system can further include one or more sub-control systems configured to control an autonomous vehicle based on the object detection.

In some implementations, the one or more optical splitters include a plurality of rows of cascaded two-way optical splitters.

In some implementations, a particular optical isolator of the one or more optical isolators can include an optical splitter having at least one input port and a plurality of output ports; and a phase shifter respectively coupled to the plurality of output ports of the optical splitter.

In some implementations, a particular optical isolator of the one or more optical isolators includes an attenuator respectively coupled to the plurality of output ports of the optical splitter.

In some implementations, a particular attenuator of the one or more attenuators can include a Mach-Zehnder modulator. The Mach-Zehnder modulator can include a first optical splitter comprising two output ports; two phase shifters coupled to the two output ports of the first optical splitter; and a second optical splitter comprising two input ports that are respectively coupled to the two phase shifters. A control signal line can be coupled to a particular phase shifter of the two phase shifters.

For example, aspects of the present disclosure provide for an autonomous vehicle. The autonomous vehicle can include a LIDAR sensor system. The LIDAR sensor system can include a light source configured to generate a beam. The LIDAR sensor system can include at least one optical amplifier configured to amplify the beam to produce an amplified beam. The LIDAR sensor system can include an optical power distribution network including: at least one input port configured to receive the amplified beam; one or more optical splitters configured to split the amplified beam into a plurality of distributed beams; a plurality of output ports respectively configured to provide the plurality of distributed beams; and one or more optical isolators configured to attenuate reflected signals at the plurality of output ports by coherently interfering the reflected signals. The LIDAR sensor system can include a transmitter configured to receive the plurality of distributed beams. The LIDAR sensor system can include one or more optics configured to emit the plurality of distributed beams. The LIDAR sensor system can include a receiver configured to receive a reflected beam from the object and determine an object detection associated with the object. The autonomous vehicle can further include one or more sub-control systems configured to control an autonomous vehicle based on the object detection.

In some implementations, a particular optical isolator of the one or more optical isolators includes an optical splitter having at least one input port and a plurality of output ports and a phase shifter respectively coupled to the plurality of output ports of the optical splitter; and a particular optical isolator of the one or more optical isolators includes an attenuator respectively coupled to the plurality of output ports of the optical splitter. The attenuator can be a Mach-Zehnder modulator. The Mach-Zehnder modulator can include a first optical splitter comprising two output ports; two phase shifters coupled to the two output ports of the first optical splitter; and a second optical splitter comprising two input ports that are respectively coupled to the two phase shifters. A control signal line can be coupled to a particular phase shifter of the two phase shifters.

Other example aspects of the present disclosure are directed to other systems, methods, vehicles, apparatuses, tangible non-transitory computer-readable media, and devices for motion prediction and/or operation of a device including a LIDAR system having a LIDAR module according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
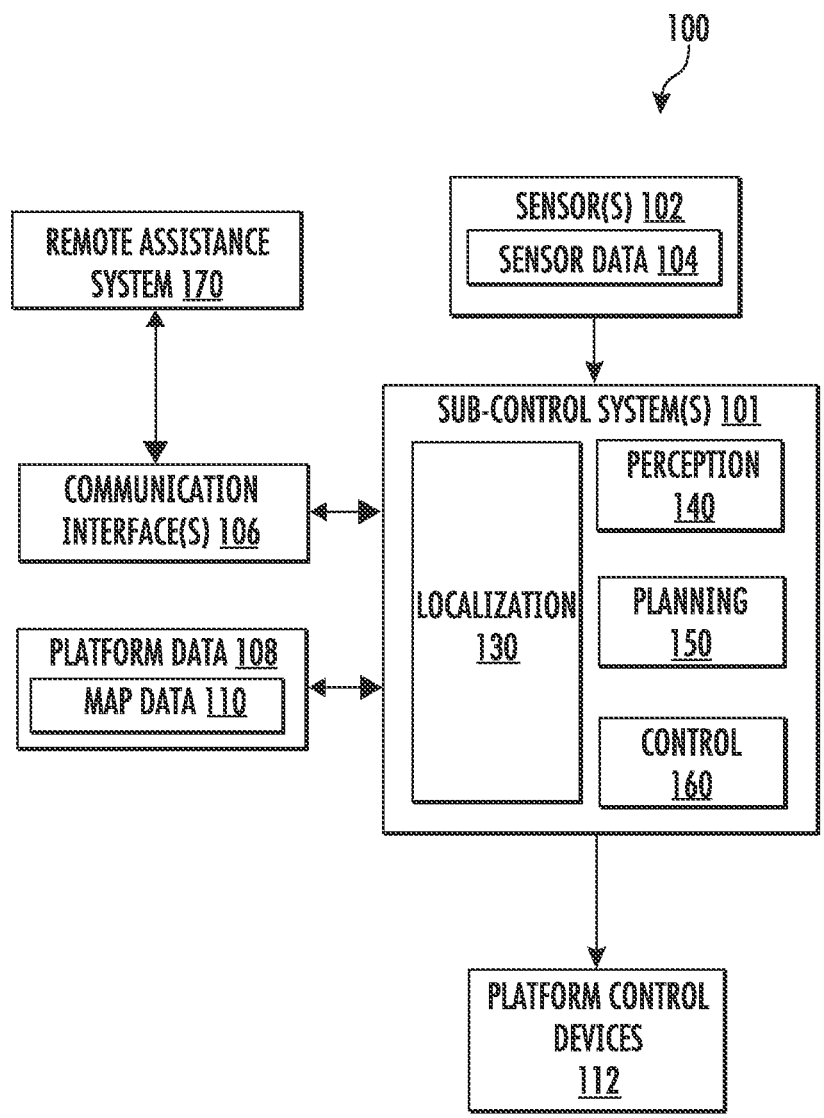
FIG. 1 depicts a block diagram of an example system according to some implementations of the present disclosure.

With reference to FIGS. 1-8, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with a particular component(s) or a system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine a current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast a future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
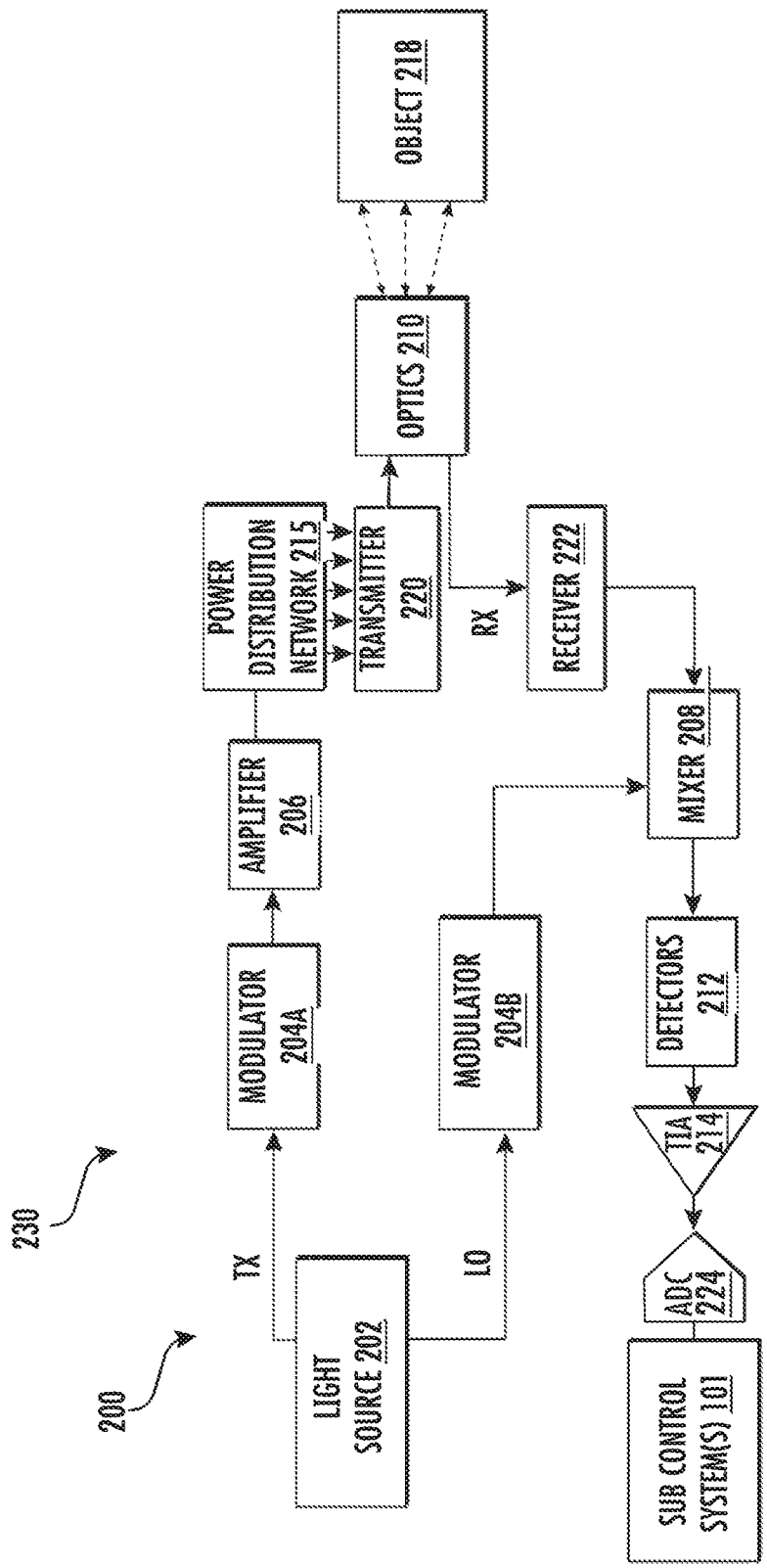
FIG. 2 depicts a block diagram of an example LIDAR system according to some implementations of the present disclosure.

FIG. 2 is a block diagram illustrating an example environment of a LIDAR sensor system for autonomous vehicles, according to some implementations. The environment includes a LIDAR sensor system 200 that includes a transmit (Tx) path and a receive (Rx) path. The Tx path includes one or more Tx input/output ports, and the Rx path includes one or more Rx input/output ports. In some implementations, a semiconductor substrate and/or semiconductor package may include the Tx path and the Rx. In some implementations, the semiconductor substrate and/or semiconductor package may include at least one of silicon photonics circuitry, programmable logic controller (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR sensor system 200 includes one or more transmitters 220 and one or more receivers 222. The LIDAR sensor system 200 further includes one or more optics 210 (e.g., an oscillatory scanner, a unidirectional scanner, a Risley prism, a circulator optic, and/or a beam collimator, etc.) that are coupled to the LIDAR sensor system 200 (e.g., the transmitter 220 and/or receiver 222). In some implementations, the one or more optics 210 may be coupled to the Tx path via the one or more Tx input/output ports. In some implementations, the one or more optics 210 may be coupled to the Rx path via the one or more Rx input/output ports.

The LIDAR sensor system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR sensor system 200. The sub-control system(s) 101 can control a vehicle (e.g., an autonomous vehicle) based on the LIDAR outputs.

The Tx path may include a light source 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs). Although FIG. 2 shows only a select number of components; the LIDAR sensor system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some cases, the light source 202 may be configured to output a light signal having an operating wavelength. In some implementations, the light signal may have an operating wavelength that is equal to or substantially equal to 1550 nanometers. In some implementations, the light signal may have an operating wavelength that is between 1400 nanometers and 1440 nanometers. However, a wavelength of the light signal is not limited to the particular wavelengths described in this paragraph. The light signal can have any suitable wavelength for design purposes under the scope of this invention.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal. The amplified light signal can be provided to the power distribution network 215. The power distribution network 215 can split the amplified light signal into a plurality of beams that are provided to the optics 210 via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz). However, bandwidths of the modulators are not limited to the particular bandwidths described in this paragraph. The modulators can have any suitable bandwidths for design purposes under the scope of this invention.

The optics 210 may be configured to steer the amplified light signal(s) that it receives from the Tx path into an environment within a given field of view toward an object 218, may receive a returned signal reflected back from the object 218, and provide the returned signal to the mixer 208 of the Rx path via the one or more receivers 222. The one or more receivers 222 may include one or more optical waveguides or antennas. In some arrangements, the transmitters 220 and the receivers 222 may collectively constitute one or more transceivers. In some arrangements, the one or more transceivers may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA via the one or more ADCs 224.

Figure 3:
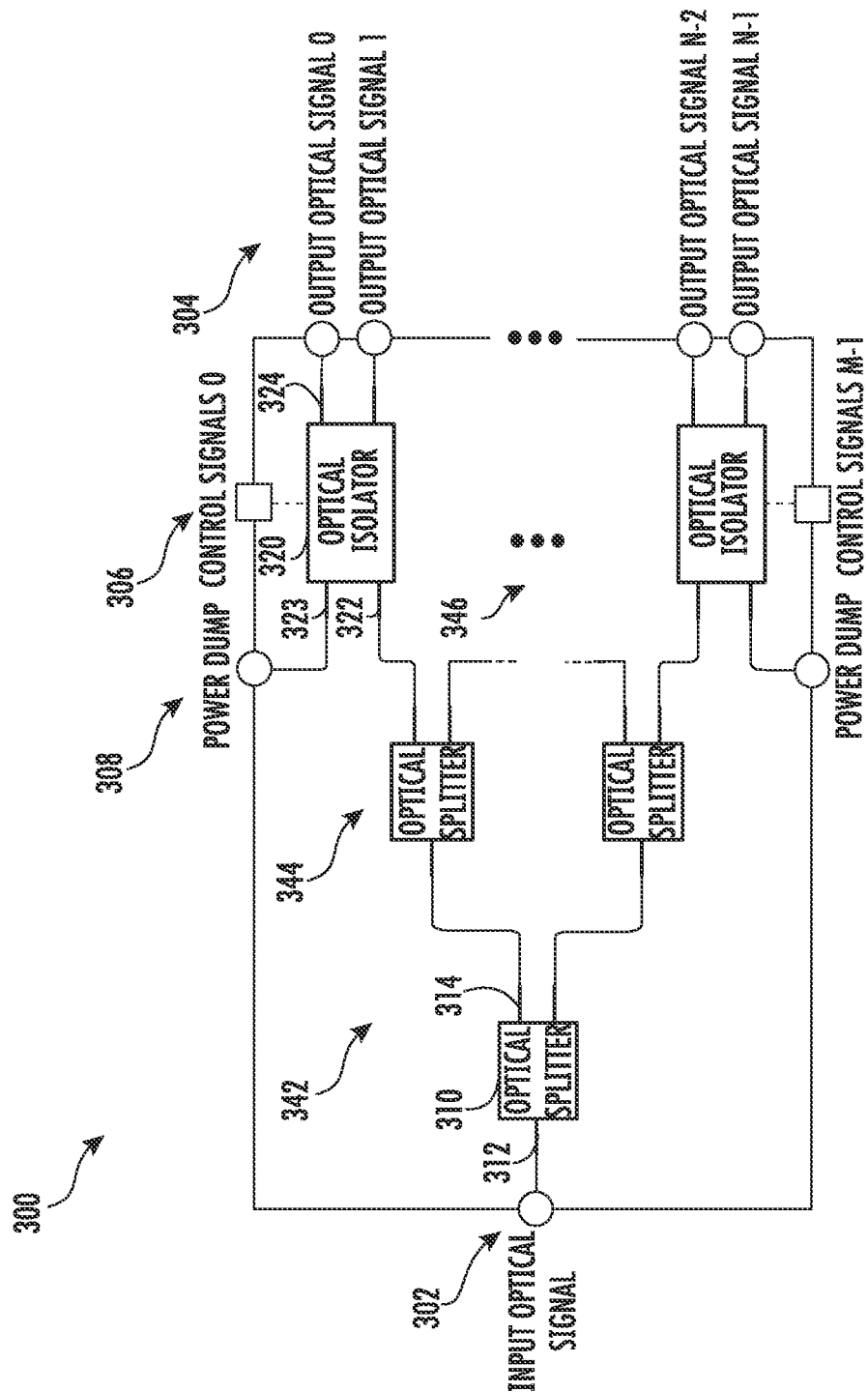
FIG. 3 depicts a diagram of an example power distribution network according to some implementations of the present disclosure.

FIG. 3 depicts a diagram of an example power distribution network 300 according to some implementations of the present disclosure. The power distribution network 300 can include at least one input port 302 configured to receive a beam. The beam can be, for instance, an amplified beam from an optical amplifier. Operational characteristics of some LIDAR systems incorporating the power distribution network 300 can be improved by mitigating the effect of reflected power at the input port 302.

The power distribution network 300 can include one or more optical splitters 310. The optical splitters 310 can be configured to split the beam from the input port 302 (e.g., an amplified beam) into a plurality of distributed beams. The power distribution network 300 can further include a plurality of output ports 304 respectively configured to provide the plurality of distributed beams. For instance, the output ports 304 can be coupled to one or more transmitters configured to provide the distributed beams to optics or other downstream components. In some implementations, the splitters 310 can be two-way splitters, or 1×2 splitters. Two-way splitters may have a single input port 312 and two output ports 314. An optical signal or beam received at the input port 312 may be split evenly between the two output ports 314. Any suitable dimensionality of splitters 310, such as 2×2 splitters, 1×4 splitters, etc. may be employed in accordance with example aspects of the present disclosure.

The power distribution network 300 can further include one or more optical isolators 320. The optical isolators 320 can be configured to attenuate reflected signals at the plurality of output ports 304 by coherently interfering the reflected signals. For instance, some energy from the signals provided by the output ports 304 can be reflected back in the direction of the power distribution network 300. This reflected power can interfere with the operation of components coupled to the input port 302 of the power distribution network 300 such as, for example, active optical amplifiers.

The optical isolators 320 can include one or more tunable components or active components, such as, for example, phase modulators, frequency modulators, and so on. The optical isolators 320 can be controlled by one or more control signals 306 to modify the signals propagating through the optical isolators 320. In particular, the optical isolators 320 can be controlled such that the reflected power can coherently interfere with the beams from the optical splitters 310. The interference can cause the reflected power to decrease (e.g., by destructive interference).

The optical isolators 320 can include two input ports 322 and 323 and one or more output ports 324. A first input port 322 can be coupled to an output port 314 of an optical splitter 310. Additionally, a second input port 323 can be coupled to a power dump port 308. When power is reflected at the output ports 324 of the optical isolators 320, that power can be split among the input ports 322, 323 of the optical isolators. Most or all of the remaining reflected power can therefore be directed to the power dump port(s) 308. The power dump port(s) 308 can be coupled to light dissipation devices, such as photoresistors, photodiodes, or other suitable devices configured to convert the reflected power into a form that does not interfere with the remaining portions of the system. For instance, a photoresistor or photodiode may convert the reflected power into light in free space. The light may be emitted from the system and dissipated into the free space such that the light does not interfere with the system.

In some implementations, the power distribution network 300 can include a plurality of rows of cascaded two-way optical splitters. As used herein, cascaded optical splitters refers to an arrangement of splitters 310 or other devices in which the devices are arranged into a progressive series of rows. Each row can have one splitter 310 (or other elements such as isolators 320) for each output port 314 of splitters 310 on a previous row. For example, in the case of a two-way optical splitter having two output ports, a subsequent row may have two splitters 310 for each splitter 310 in the previous row. In the example of FIG. 3, a first row 342 can have one splitter 310 while a second row 344 can have two splitters 310. Furthermore, a third row 346 can have four isolators 320. In this manner, the number of output ports 304 of the power distribution network 300 can be represented by $2^{X-1}$, where X is the number of rows.

In the example of FIG. 3, the optical isolators 320 are configured at a final row (the third row 346) of the plurality of rows 342, 344, 346. However, the optical isolator(s) 320 can be configured at any suitable row. For instance, in some implementations, the optical isolators 320 can be configured at the first row 342. For instance, the power distribution network 300 may include a single optical isolator 320 coupled directly to the input port 302. Furthermore, in some implementations, multiple rows of optical isolators 320 (e.g., a first row 342 and/or a final row 346) may be included in the power distribution network 300.

Figure 4:
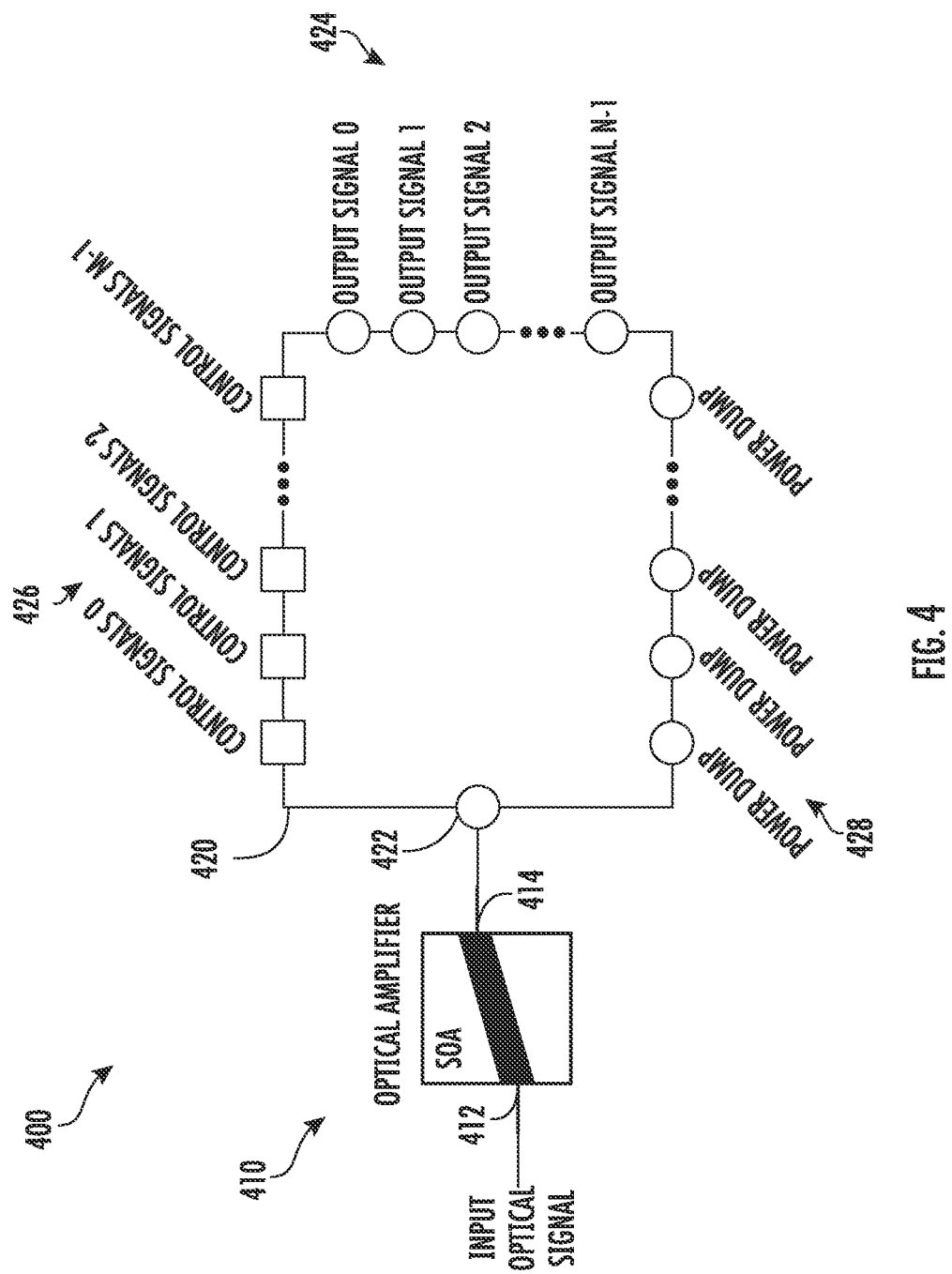
FIG. 4 depicts a diagram of an example optical system according to some implementations of the present disclosure.

FIG. 4 depicts a diagram of a portion of an example system 400 according to some implementations of the present disclosure. The system 400 includes an optical amplifier 410 coupled to a power distribution network 420. The optical amplifier 410 can be a semiconductor optical amplifier (SOA). The optical amplifier 410 can include an input port 412 configured to receive an input optical signal. The optical amplifier 410 can amplify the input optical signal and output an amplified signal at an output port 414. The optical amplifier 410 may be active and nonlinear. For instance, the optical amplifier 410 may inject additional power into its output signal compared to its input signal. However, the optical amplifier 410 may be sensitive to reflected power at its output port 414.

The output port 414 of the optical amplifier 410 can be coupled to at least one input port 422 of the power distribution network 420. The power distribution network 420 can split the signal received at input port 422 among a plurality of output ports 424. For instance, the power distribution network 420 can evenly split the signal (e.g., split the input power) from input port 422 among the plurality of output ports 424. Additionally or alternatively, in some implementations, the power distribution network 420 can unevenly distribute power among the plurality of output ports 424. The signals from the plurality of output ports 424 can be provided to downstream components of a LIDAR system, such as a transmitter, optics, and/or other suitable components.

The power distribution network 420 can include one or more optical isolators. The optical isolators can be configured to attenuate reflected signals at the plurality of output ports 424 by coherently interfering the reflected signals. In particular, the power distribution network 420 can include one or more control signal lines 426 configured to provide control signals to the optical isolators. Additionally, the optical isolators can be configured to direct reflected power from the output ports 424 to one or more power dump ports 428. In some implementations, the power dump ports 428 can be coupled to one or more light dissipation devices configured to dissipate the reflected power.

Figure 5:
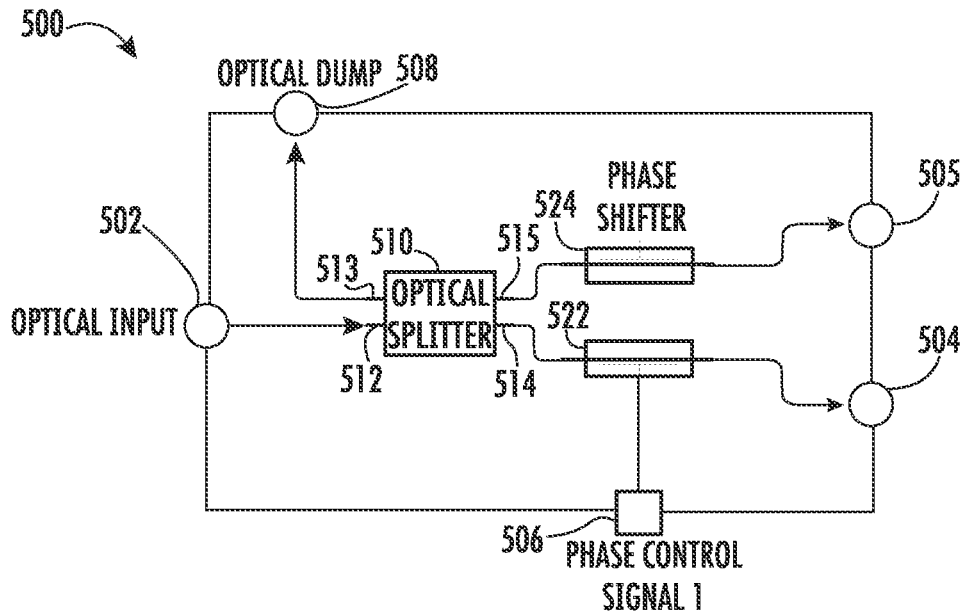
FIG. 5 depicts a diagram of an example optical isolator according to some implementations of the present disclosure.

FIG. 5 depicts a diagram of an example optical isolator 500 according to some implementations of the present disclosure. The optical isolator 500 can be included as an optical isolator for an optical power distribution network of a LIDAR system such as, for example, the optical isolator(s) 320 of FIG. 3. The optical isolator 500 can include at least one input port 502 and one or more output ports, such as a first output port 504 and a second output port 505.

The optical isolator 500 can include an optical splitter 510. The optical splitter 510 can include at least one input port, such as at least two input ports, such as a first input port 512 and a second input port 513. Additionally or alternatively, the optical splitter 510 can include a plurality of output ports, such as a first output port 514 and a second output port 515. The first input port 512 of the optical splitter 510 can be coupled to the input port 502 of the optical isolator 500. For instance, the optical splitter 510 can split an input optical signal from the input port 502 among the plurality of output ports 514, 515. The second input port 513 of the optical splitter 510 can be coupled to an optical dump port 508 of the optical isolator. The optical dump port 508 can be coupled to a light dissipation device that is configured to dissipate reflected power from the second input port 513 of the optical splitter 510.

The optical isolator 500 can include phase shifter(s) respectively coupled to the plurality of output ports of the optical splitter 510. For instance, the optical isolator 500 can include a first phase shifter 522 coupled to the first output port 514 of the optical splitter 510. Additionally or alternatively, the optical isolator 500 can include a second phase shifter 524 coupled to the second output port 515 of the optical splitter 510. In some implementations, the second phase shifter 524 may be omitted. In some implementations, the second phase shifter 524 may be included even if not controlled to balance loss on the two output ports 514, 515 of the optical splitter 510. The phase shifters 522, 524 can shift a phase of an optical signal passing through the phase shifters 522, 524. For instance, the first phase shifter 522 and the second phase shifter 524 can be configured to balance the phases of the reflected signals such that the reflected signals coherently (e.g., constructively or destructively) interfere at the second input port 513.

The optical isolator can further include a control signal line 506 coupled to the phase shifter(s) at one of the plurality of output ports 514, 515 of the optical splitter. In some implementations, a phase control signal may be applied to only one of the phase shifters 522, 524 to vary the phase difference between the two reflected signals to compensate for phase drift in the reflected signals. In some implementations, multiple control signal lines may be provided such that multiple phase shifters (e.g., second phase shifter 524) may additionally be controlled. The control signal line 506 can provide control signals to the first phase shifter 522 to control an amount by which the phase shifter 522 shifts a phase of the signal from the first output port 514 of the optical splitter 510 and reflected signals from the first output port 504 of the optical isolator 500.

The control signal at the control signal line 506 can cause the phase shifter 522 to adjust the phase of the signals passing through the phase shifter 522, thereby controlling the phase difference between the reflected signals from the first output port 504 and the second output port 505 of the optical isolator 500. The phase shifters 522, 524 can shift the phase of the reflected signals of the output ports 504, 505 of the optical isolator 500 such that they coherently interfere at the input ports 512, 513 of the optical splitter 510. For instance, the reflected signals can destructively interfere at the first input port 512 and constructively interfere at the second input port 513, thereby dumping all the reflected signal into the optical dump port 508. The reflected signals may therefore coherently interfere as they enter the optical splitter 510. After interfering, the remaining reflected signal, if any, may exit the optical isolator 500 through the optical dump port 508.

Figure 6:
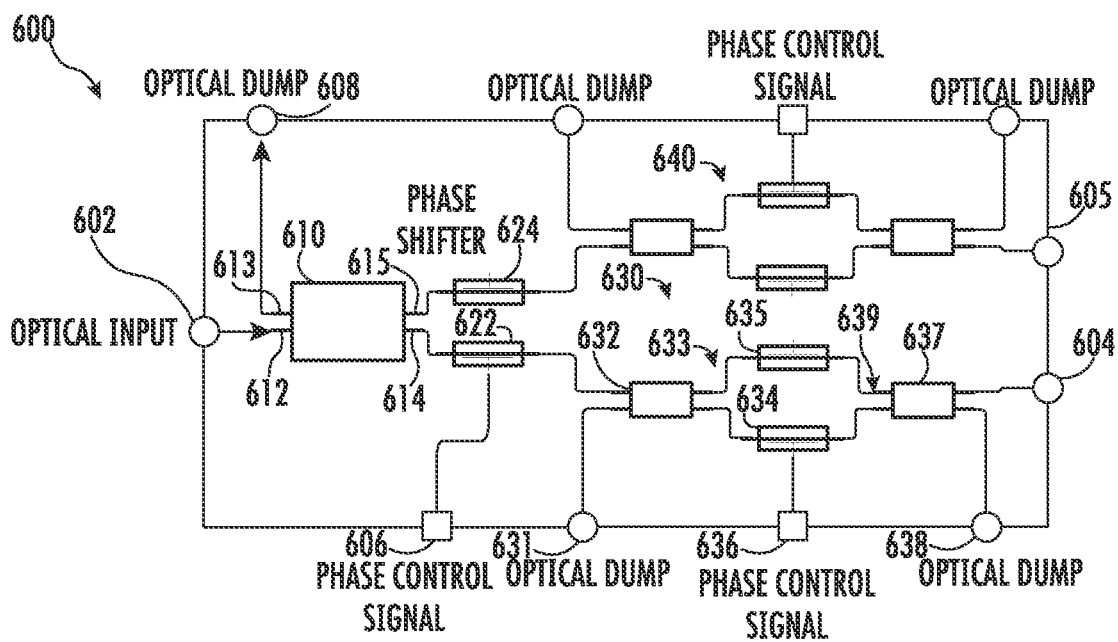
FIG. 6 depicts a diagram of an example optical isolator according to some implementations of the present disclosure.

FIG. 6 depicts a diagram of an example optical isolator 600 according to some implementations of the present disclosure. The optical isolator 600 can be included as an optical isolator for an optical power distribution network of a LIDAR system such as, for example, the optical isolator(s) 320 of FIG. 3. The optical isolator 600 can include an optical splitter 610. The optical splitter 610 can include at least one input port, such as at least two input ports, such as a first input port 612 and a second input port 613. Additionally or alternatively, the optical splitter 610 can include a plurality of output ports, such as a first output port 614 and a second output port 615. The first input port 612 of the optical splitter 610 can be coupled to the input port 602 of the optical isolator 600. For instance, the optical splitter 610 can split an input optical signal from the input port 602 among the plurality of output ports 614, 615. The second input port 613 of the optical splitter 610 can be coupled to an optical dump port 608 of the optical isolator. The optical dump port 608 can be coupled to a light dissipation device that is configured to dissipate reflected power from the second input port 613 of the optical splitter 610.

The optical isolator 600 can include phase shifter(s) respectively coupled to the plurality of output ports of the optical splitter 610. For instance, the optical isolator 600 can include a first phase shifter 622 coupled to the first output port 614 of the optical splitter 610. Additionally or alternatively, the optical isolator 600 can include a second phase shifter 624 coupled to the second output port 615 of the optical splitter 610. In some implementations, the second phase shifter 624 may be omitted. In some implementations, the second phase shifter 624 may be included even if not controlled to balance loss on the two output ports 614, 615 of the optical splitter 610. The phase shifters 622, 624 can shift a phase of an optical signal passing through the phase shifters 622, 624. For instance, the optical isolator can further include a control signal line 606 coupled to the phase shifter(s) at one of the plurality of output ports 614, 615 of the optical splitter 610. In some implementations, multiple control signal lines may be provided such that multiple phase shifters (e.g., second phase shifter 624) may additionally be controlled. The control signal line 606 can provide control signals to the first phase shifter 622 to control an amount by which the phase shifter 622 shifts a phase of the signal from the first output port 614 of the optical splitter 610 and reflected signals from the first output port 604 of the optical isolator 600. The control signal at the control signal line 606 can cause the phase shifter 622 to adjust the phase of the signals passing through the phase shifter 622, thereby controlling the phase difference between the reflected signals from the first output port 604 and the second output port 605 of the optical isolator 600. The phase shifters 622, 624 can shift the phase of the reflected signals of the output ports 604, 605 of the optical isolator 600 such that they coherently interfere at the input ports 612, 613 of the optical splitter 610. For instance, the reflected signals can destructively interfere at the first input port 612 and constructively interfere at the second input port 613, thereby dumping all the reflected signal into the optical dump port 608. For instance, the reflected signals may interfere as they enter the optical splitter 610. After interfering, the remaining reflected signal, if any, may exit the optical isolator 600 through the optical dump port 608.

In addition to the phase shifters 622, 624, the optical isolator 600 can further include an attenuator respectively coupled to the plurality of output ports of the optical splitter 610. For instance, a first attenuator 630 can be coupled to the first output port 614 of the optical splitter 610. The first attenuator 630 can be configured to attenuate reflected signals between the first output port 604 of the optical isolator 600 and the first output port 614 of the optical splitter 610. Additionally or alternatively, a second attenuator 640 can be coupled to the second output port 615 of the optical splitter. The second attenuator 640 can be configured to attenuate reflected signals between the second output port 605 of the optical isolator 600 and the second output port 615 of the optical splitter 610. In this manner, the reflected signals may be attenuated such that their amplitude or strength is decreased even before coherently interfering at the optical splitter 610.

Any suitable attenuator can be utilized according to example aspects of the present disclosure. In the example of FIG. 6, the attenuators 630, 640 are Mach-Zehnder modulators. A Mach-Zehnder modulator is a device used to control the amplitude of an optical wave. An input signal to the Mach-Zehnder modulator can be split into two signals, and a phase shift is induced in one of the split signals. The signals are then recombined, and the phase difference between the signals can induce an amplitude modulation (e.g., attenuation) in the recombined signal. The Mach-Zehnder modulator may be a bidirectional attenuator. For instance, the Mach-Zehnder modulator may attenuate signals passing both forward (e.g., input signals from the input port 602 to the output ports 604, 605) and backward (e.g., reflected signals from the output ports 604, 605 toward the input port 602).

For instance, in some implementations, the attenuator 630 (e.g., Mach-Zehnder modulator) can include a first optical splitter 632. In some implementations, the first optical splitter 632 can include two input ports. A first input port can be coupled to the first phase shifter 622. Additionally or alternatively, in some implementations, a second input port can be coupled to an optical dump port 631.

Furthermore, in some implementations, the first optical splitter 632 can include two output ports 633. Two phase shifters 634, 635 can be coupled to the two output ports 633 of the first optical splitter 632. In some implementations, the second phase shifter 635 may be omitted. A control signal line 636 can be coupled to one of the two phase shifters 634, 635. For instance, the first phase shifter 634 and the second phase shifter 635 can be configured to balance the phases of the reflected signals such that the reflected signals coherently (e.g., constructively or destructively) interfere at the first optical splitter 632. For instance, the control signal line 636 can provide control signals to the first phase shifter 634 to cause the first phase shifter 634 to induce a phase shift in the signal passing through the first phase shifter 634. In some implementations, a phase control signal may be applied to only one of the phase shifters 634, 635 to vary the phase difference between the two reflected signals to compensate for phase drift in the reflected signals.

Furthermore, the attenuator 630 (e.g., Mach-Zehnder modulator) can include a second optical splitter 637 having two input ports 639. The two input ports 639 can be respectively coupled to the two phase shifters 634, 635. Additionally, in some implementations, the second optical splitter 637 can include two output ports. A first output port of the optical splitter 637 can be coupled to the first output port 604 of the optical isolator 600. Additionally or alternatively, a second output port of the optical splitter 637 can be coupled to an optical dump port 638.

Figure 7:
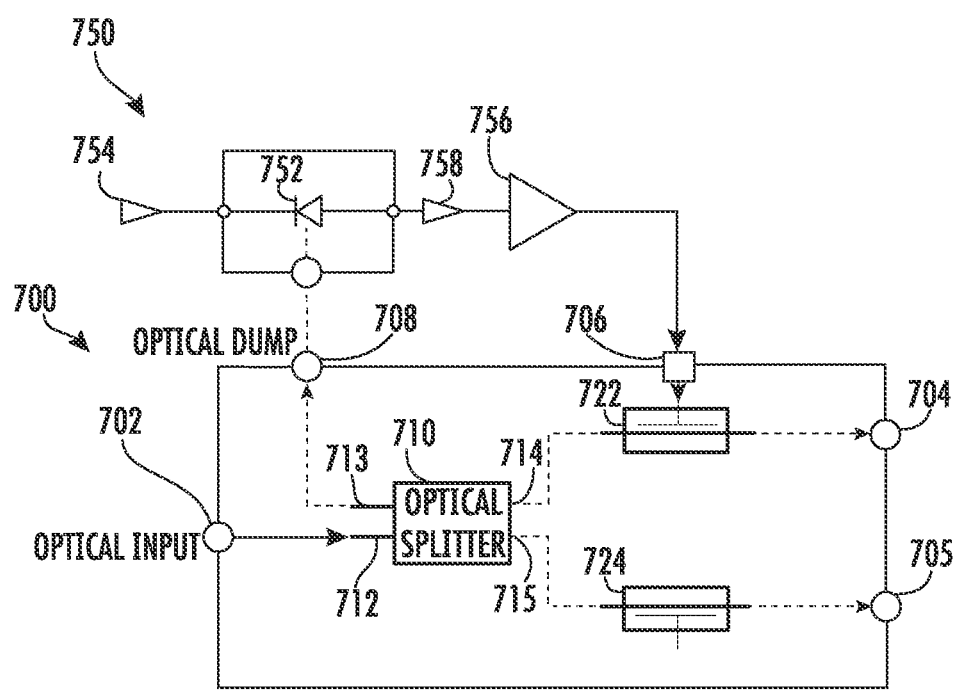
FIG. 7 depicts a diagram of an example optical isolator according to some implementations of the present disclosure.

FIG. 7 depicts a diagram of an example optical isolator 700 according to some implementations of the present disclosure. The optical isolator 700 can be included as an optical isolator for an optical power distribution network of a LIDAR system such as, for example, the optical isolator(s) 320 of FIG. 3. The optical isolator 700 can include at least one input port 702 and one or more output ports, such as a first output port 704 and a second output port 705.

The optical isolator 700 can include an optical splitter 710. The optical splitter 710 can include at least one input port, such as at least two input ports, such as a first input port 712 and a second input port 713. Additionally or alternatively, the optical splitter 710 can include a plurality of output ports, such as a first output port 714 and a second output port 715. The first input port 712 of the optical splitter 710 can be coupled to the input port 702 of the optical isolator 700. For instance, the optical splitter 710 can split an input optical signal from the input port 702 among the plurality of output ports 714, 715. The second input port 713 of the optical splitter 710 can be coupled to an optical dump port 708 of the optical isolator.

The optical isolator 700 can include phase shifter(s) respectively coupled to the plurality of output ports of the optical splitter 710. For instance, the optical isolator 700 can include a first phase shifter 722 coupled to the first output port 714 of the optical splitter 710. Additionally or alternatively, the optical isolator 700 can include a second phase shifter 724 coupled to the second output port 715 of the optical splitter 710. In some implementations, the second phase shifter 724 may be omitted. In some implementations, the second phase shifter 724 may be included even if not controlled to balance loss on the two output ports 714, 715 of the optical splitter 710. The phase shifters 722, 724 can shift a phase of an optical signal passing through the phase shifters 722, 724. For instance, the first phase shifter 722 and the second phase shifter 724 can be configured to balance the phases of the reflected signals such that the reflected signals coherently (e.g., constructively or destructively) interfere at the second input port 713.

The optical isolator can further include a control signal line 706 coupled to the phase shifter(s) at one of the plurality of output ports 714, 715 of the optical splitter. In some implementations, a phase control signal may be applied to only one of the phase shifters 722, 724 to vary the phase difference between the two reflected signals to compensate for phase drift in the reflected signals. In some implementations, multiple control signal lines may be provided such that multiple phase shifters (e.g., second phase shifter 724) may additionally be controlled. The control signal line 706 can provide control signals to the first phase shifter 722 to control an amount by which the phase shifter 722 shifts a phase of the signal from the first output port 714 of the optical splitter 710 and reflected signals from the first output port 704 of the optical isolator 700. The control signal at the control signal line 706 can cause the phase shifter 722 to adjust the phase of the signals passing through the phase shifter 722, thereby controlling the phase difference between the reflected signals from the first output port 704 and the second output port 705 of the optical isolator 700. The phase shifters 722, 724 can shift the phase of the reflected signals of the output ports 704, 705 of the optical isolator 700 such that they coherently interfere at the input ports 712, 713 of the optical splitter 710. For instance, the reflected signals can destructively interfere at the first input port 712 and constructively interfere at the second input port 713, thereby dumping all the reflected signal into the optical dump port 708 For instance, the reflected signals may interfere as they enter the optical splitter 710. After interfering, the remaining reflected signal, if any, may exit the optical isolator 700 through the optical dump port 708.

The optical isolator 700 can be controlled by a feedback device 750. The feedback device 750 can produce control signals for the control signal line 706 based on the amount of power at the optical dump port 708. For instance, the optical dump port 708 can be coupled to a photodiode 752. The photodiode 752 can emit current proportional to the optical power at optical dump port 708. The feedback device 750 can further include a voltage source 754 and a transimpedance amplifier (TIA) 758 configured to convert the current generated by the photodiode 752 into a voltage signal. Collectively, the voltage source 754, the photodiode 752, and the TIA 758 can be a reflected signal monitor configured to measure the power of the reflected signal at the optical dump port 708 and generate a voltage proportional to its power. The feedback device 750 can further include a servo 756 configured to generate a control signal for the control signal line 706 based on the signals from the TIA 758. In this manner, the phase shifter 722 can be controlled responsive to the amount of reflected power entering the output ports 704, 705 of the optical isolator 700 and provided to the optical dump port 708.

Figure 8:
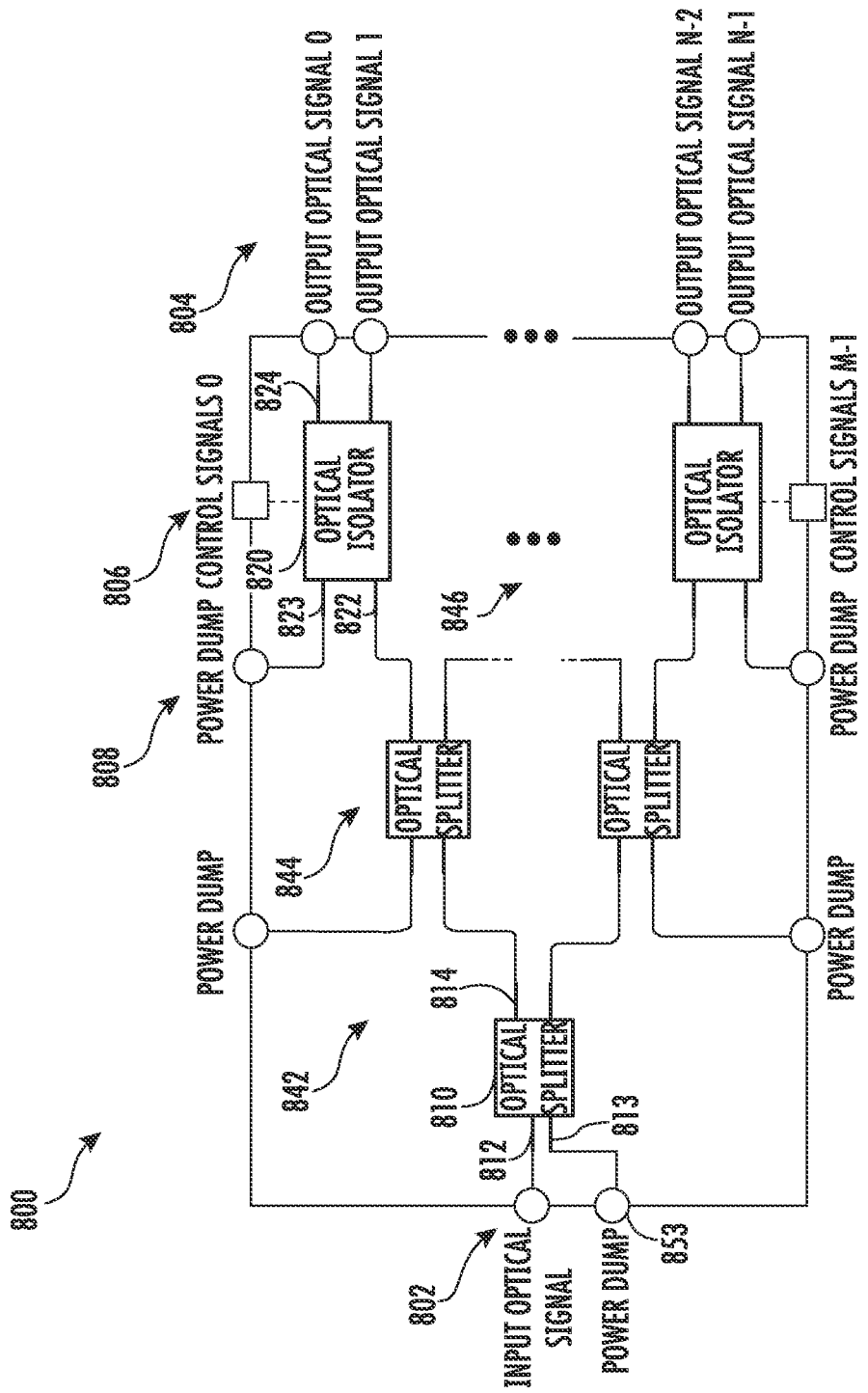
FIG. 8 depicts a diagram of an example power distribution network according to some implementations of the present disclosure.

FIG. 8 depicts a diagram of an example power distribution network 800 according to some implementations of the present disclosure. The power distribution network 800 can include at least one input port 802 configured to receive a beam. The beam can be, for instance, an amplified beam from an optical amplifier. Operational characteristics of some LIDAR systems incorporating the power distribution network 800 can be improved by mitigating the effect of reflected power at the input port 802.

The power distribution network 800 can include one or more optical splitters 810. The optical splitters 810 can be configured to split the beam from the input port 802 (e.g., an amplified beam) into a plurality of distributed beams. The power distribution network 800 can further include a plurality of output ports 804 respectively configured to provide the plurality of distributed beams. For instance, the output ports 804 can be coupled to one or more transmitters configured to provide the distributed beams to optics or other downstream components.

In some implementations, the splitters 810 can respectively have at least two input ports, such as a first input port 812 and a second input port 813. For instance, the splitters 810 may be 2×2 splitters. At least one of the at least two input ports can be coupled to a light dissipation device. For instance, in the example of FIG. 8, the optical splitters 810 include a second input port 813 coupled to a power dump port 853. The power dump port 853 can be coupled to a light dissipation device, such as a photoresistor. In this manner, power reflected from the output ports 804 of the power distribution network 800 can be divided between the input ports 812, 813 of the splitters, and half of that reflected power can be dissipated at each splitter 810.

The power distribution network 800 can further include one or more optical isolators 820. The optical isolators 820 can be configured to attenuate reflected signals at the plurality of output ports 804 by coherently interfering the reflected signals. For instance, some energy from the signals provided by the output ports 804 can be reflected back in the direction of the power distribution network 800. This reflected power can interfere with the operation of components coupled to the input port 802 of the power distribution network 800 such as, for example, active optical amplifiers.

The optical isolators 820 can include one or more tunable components or active components, such as, for example, phase modulators, frequency modulators, and so on. The optical isolators 820 can be controlled by one or more control signals 806 to modify the signals propagating through the optical isolators 820. In particular, the optical isolators 820 can be controlled such that the reflected power can coherently interfere within the optical splitters 810. The interference can cause the reflected power to decrease (e.g., by destructive interference).

The optical isolators 820 can include two input ports 822 and 823 and one or more output ports 824. A first input port 822 can be coupled to an output port 814 of an optical splitter 810. Additionally, a second input port 823 can be coupled to a power dump port 808. When power is reflected at the output ports 824 of the optical isolators 820, that power can be split among the input ports 822, 823 of the optical isolators. Most or all of the remaining reflected power can therefore be directed to the power dump port(s) 808. The power dump port(s) 808 can be coupled to light dissipation devices, such as photoresistors, photodiodes, or other suitable devices configured to convert the reflected power into a form that does not interfere with the remaining portions of the system. For instance, a photoresistor or photodiode may convert the reflected power into electrical current, which can result in dissipation of the light at the reflected port.

In some implementations, the power distribution network 800 can include a plurality of rows of cascaded two-way optical splitters. As used herein, cascaded optical splitters refers to an arrangement of splitters 810 or other devices in which the devices are arranged into a progressive series of rows. Each row can have one splitter 810 (or other elements such as isolators 820) for each output port 814 of splitters 810 on a previous row. For example, in the case of a two-way optical splitter having two output ports, a subsequent row may have two splitters 810 for each splitter 810 in the previous row. In the example of FIG. 8, a first row 842 can have one splitter 810 while a second row 844 can have two splitters 810. Furthermore, a third row 846 can have four isolators 820. In this manner, the number of output ports 804 of the power distribution network 800 can be represented by $2^{X-1}$, where X is the number of rows.

In the example of FIG. 8, the optical isolators 820 are configured at a final row (the third row 846) of the plurality of rows 842, 844, 846. However, the optical isolator(s) 820 can be configured at any suitable row. For instance, in some implementations, the optical isolators 820 can be configured at the first row 842. For instance, the power distribution network 800 may include a single optical isolator 820 coupled directly to the input port 802. Furthermore, in some implementations, multiple rows of optical isolators 820 (e.g., a first row 842 and/or a final row 846) may be included in the power distribution network 800.

The following describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A LIDAR sensor system for a vehicle, the LIDAR sensor system comprising:
   a light source configured to generate a beam;
   at least one optical amplifier configured to amplify the beam to produce an amplified beam;
   an optical power distribution network comprising:
      at least one input port configured to receive the amplified beam;
      one or more optical splitters configured to split the amplified beam into a plurality of distributed beams;
      a plurality of output ports respectively configured to provide the plurality of distributed beams; and
      one or more optical isolators configured to attenuate reflected signals at the plurality of output ports by coherently interfering the reflected signals;
   a transmitter configured to receive the plurality of distributed beams; and
   one or more optics configured to emit the plurality of distributed beams.

2. The LIDAR sensor system of claim 1, wherein the one or more optical splitters comprise a plurality of rows of cascaded two-way optical splitters.

3. The LIDAR sensor system of claim 2, wherein the one or more optical isolators are configured at a first row of the plurality of rows.

4. The LIDAR sensor system of claim 2, wherein the one or more optical isolators are configured at a final row of the plurality of rows.

5. The LIDAR sensor system of claim 1, wherein the one or more optical isolators respectively comprise:
   an optical splitter comprising at least one input port and a plurality of output ports; and
   a phase shifter respectively coupled to the plurality of output ports of the optical splitter.

6. The LIDAR sensor system of claim 5, wherein the optical splitter of the one or more optical isolators comprises a two-way splitter having two output ports.

7. The LIDAR sensor system of claim 5, wherein the one or more optical isolators comprise one or more attenuators that are coupled to the plurality of output ports of the optical splitter.

8. The LIDAR sensor system of claim 7, wherein a particular attenuator of the one or more attenuators comprises a Mach-Zehnder modulator, the Mach-Zehnder modulator comprising:
   a first optical splitter comprising two output ports;
   two phase shifters coupled to the two output ports of the first optical splitter; and
   a second optical splitter comprising two input ports that are respectively coupled to the two phase shifters;
   wherein a control signal line is coupled to a particular phase shifter of the two phase shifters.

9. The LIDAR sensor system of claim 5, wherein a particular optical isolator of the one or more optical isolators comprises a control signal line coupled to the phase shifter at one of the plurality of output ports of the optical splitter.

10. The LIDAR sensor system of claim 5, wherein a particular optical isolator of the one or more optical isolators comprises at least two input ports, wherein at least one of the at least two input ports is coupled to a light dissipation device.

11. The LIDAR sensor system of claim 1, wherein a particular optical isolator of the one or more optical isolators comprises at least two input ports, wherein at least one of the at least two input ports is coupled to a light dissipation device.

12. The LIDAR sensor system of claim 1, wherein the at least one optical amplifier is active and nonlinear.

13. The LIDAR sensor system of claim 1, wherein the one or more optics are configured to emit the plurality of distributed beams, and wherein the LIDAR sensor system further comprises a receiver configured to receive a reflected beam and determine an object detection associated with an object that reflected the reflected beam.

14. An autonomous vehicle control system, comprising:
   a LIDAR sensor system, the LIDAR sensor system comprising:
      a light source configured to generate a beam;
      at least one optical amplifier configured to amplify the beam to produce an amplified beam;
      an optical power distribution network comprising:
         at least one input port configured to receive the amplified beam;
         one or more optical splitters configured to split the amplified beam into a plurality of distributed beams;
         a plurality of output ports respectively configured to provide the plurality of distributed beams; and
         one or more optical isolators configured to attenuate reflected signals at the plurality of output ports by coherently interfering the reflected signals;
      a transmitter configured to receive the plurality of distributed beams;
      one or more optics configured to emit the plurality of distributed beams at an object; and
      a receiver configured to receive a reflected beam from the object and determine an object detection associated with the object; and
   one or more sub-control systems configured to control an autonomous vehicle based on the object detection.

15. The autonomous vehicle control system of claim 14, wherein the one or more optical splitters comprise a plurality of rows of cascaded two-way optical splitters.

16. The autonomous vehicle control system of claim 14, wherein a particular optical isolator of the one or more optical isolators comprises:
   an optical splitter comprising at least one input port and a plurality of output ports; and
   a phase shifter respectively coupled to the plurality of output ports of the optical splitter.

17. The autonomous vehicle control system of claim 16, wherein a particular optical isolator of the one or more optical isolators comprises an attenuator respectively coupled to the plurality of output ports of the optical splitter.

18. The autonomous vehicle control system of claim 17, wherein the attenuator comprises a Mach-Zehnder modulator, the Mach-Zehnder modulator comprising:
   a first optical splitter comprising two output ports;
   two phase shifters coupled to the two output ports of the first optical splitter; and
   a second optical splitter comprising two input ports, the two input ports coupled to the two phase shifters;
   wherein a control signal line is coupled to one of the two phase shifters.

19. An autonomous vehicle, comprising:
a LIDAR sensor system, the LIDAR sensor system comprising:
a light source configured to generate a beam;
at least one optical amplifier configured to amplify the beam to produce an amplified beam;
an optical power distribution network comprising:
- at least one input port configured to receive the amplified beam;
- one or more optical splitters configured to split the amplified beam into a plurality of distributed beams;
- a plurality of output ports respectively configured to provide the plurality of distributed beams; and
- one or more optical isolators configured to attenuate reflected signals at the plurality of output ports by coherently interfering the reflected signals;

a transmitter configured to receive the plurality of distributed beams;
one or more optics configured to emit the plurality of distributed beams at a target; and
a receiver configured to receive a reflected beam from the target and determine an object detection associated with the target; and
an autonomous vehicle controller configured to control the autonomous vehicle based on the object detection associated with the target.

20. The autonomous vehicle of claim 19, wherein:
a particular optical isolator of the one or more optical isolators comprises an optical splitter comprising at least one input port and a plurality of output ports and a phase shifter respectively coupled to the plurality of output ports of the optical splitter; and
a particular optical isolator of the one or more optical isolators comprises an attenuator respectively coupled to the plurality of output ports of the optical splitter, wherein the attenuator comprises a Mach-Zehnder modulator, the Mach-Zehnder modulator comprising:
a first optical splitter comprising two output ports;
two phase shifters coupled to the two output ports of the first optical splitter, wherein a control signal line is coupled to one of the two phase shifters; and
a second optical splitter comprising two input ports, the two input ports coupled to the two phase shifters.

* * * * *